United States Patent
Starzengruber et al.

(10) Patent No.: US 12,220,775 B2
(45) Date of Patent: Feb. 11, 2025

(54) STUD WELDING PROCESS AND STUD WELDING DEVICE FOR WELDING A STUD TO A WORKPIECE

(71) Applicant: Hilti Aktiengesellschaft, Schaan (LI)

(72) Inventors: Andreas Starzengruber, Pettenbach (AT); Philipp Dörner, Pettenbach (AT)

(73) Assignee: Hilti Aktiengesellschaft, Schaan (LI)

( * ) Notice: Subject to any disclaimer, the term of this patent is extended or adjusted under 35 U.S.C. 154(b) by 847 days.

(21) Appl. No.: 17/431,354

(22) PCT Filed: Feb. 25, 2020

(86) PCT No.: PCT/EP2020/054938
§ 371 (c)(1),
(2) Date: Aug. 16, 2021

(87) PCT Pub. No.: WO2020/173957
PCT Pub. Date: Sep. 3, 2020

(65) Prior Publication Data
US 2022/0152722 A1    May 19, 2022

(30) Foreign Application Priority Data
Feb. 27, 2019 (EP) .................................. 19159636

(51) Int. Cl.
*B23K 9/20* (2006.01)
*B23K 9/08* (2006.01)
(Continued)

(52) U.S. Cl.
CPC .................. *B23K 9/20* (2013.01); *B23K 9/08* (2013.01); *B23K 9/091* (2013.01); *B23K 9/095* (2013.01)

(58) Field of Classification Search
None
See application file for complete search history.

(56) References Cited

U.S. PATENT DOCUMENTS

| | | | | |
|---|---|---|---|---|
| 2,439,830 A | * | 4/1948 | Varela | B23K 9/202 219/98 |
| 2,473,871 A | * | 6/1949 | Edels | B23K 9/202 219/98 |

(Continued)

FOREIGN PATENT DOCUMENTS

| | | |
|---|---|---|
| CN | 85 1 06720 A | 2/1986 |
| CN | 101468420 A | 7/2009 |

(Continued)

OTHER PUBLICATIONS

Machine translation of DE-102009054365-A1, Aug. 2024 (Year: 2024).*

(Continued)

*Primary Examiner* — Geoffrey S Evans
(74) *Attorney, Agent, or Firm* — Leydig, Voit & Mayer, Ltd.

(57) ABSTRACT

A stud welding process and a stud welding device for welding a stud to a workpiece are provided, wherein an arc (LB) is generated between the surface of the stud that faces the workpiece and the workpiece by using a pulsed welding current (Is), and the arc (LB) is deflected by a magnetic field which is generated by a coil through which a current ($I_A$) flows. The current ($I_A$) through the coil for generating the magnetic field for deflecting the arc (LB) is activated synchronously and in anti-phase with the welding current ($I_s$) by a current ($I_A$) always being applied to the coil when the welding current ($I_s$) is at a minimum, and the coil being switched off or the current ($I_A$) through the coil being reduced to a minimum when the welding current ($I_s$) is at a maximum.

20 Claims, 6 Drawing Sheets

(51) Int. Cl.
   *B23K 9/09* (2006.01)
   *B23K 9/095* (2006.01)

(56) References Cited

U.S. PATENT DOCUMENTS

| | | | |
|---|---|---|---|
| 10,239,145 B2 | 3/2019 | Matthews et al. | |
| 2010/0176093 A1 | 7/2010 | Schmitt | |
| 2013/0256288 A1 | 10/2013 | Matthews et al. | |
| 2014/0263228 A1* | 9/2014 | Peters | B23K 9/093 |
| | | | 219/130.1 |

FOREIGN PATENT DOCUMENTS

| | | | | |
|---|---|---|---|---|
| CN | 104334304 A | 2/2015 | | |
| CN | 104475923 A | 4/2015 | | |
| CN | 105149733 A | 12/2015 | | |
| CN | 108213649 A | 6/2018 | | |
| DE | 102 21 387 C1 | 7/2003 | | |
| DE | 10 2007 039 308 A1 | 2/2009 | | |
| DE | 102009054365 A1 * | 5/2011 | ............... | B23K 9/08 |
| DE | 20 2013 011 903 U1 | 2/2015 | | |
| DE | 10 2017 211725 A1 | 1/2019 | | |
| EP | 1 649 962 B1 | 4/2006 | | |
| JP | S52-57054 A | 5/1977 | | |
| JP | S55-141378 A | 11/1980 | | |
| JP | S56-26516 B2 | 6/1981 | | |
| JP | S61-49025 B2 | 10/1986 | | |
| JP | H7-195176 A | 8/1995 | | |
| JP | 3196715 U | 3/2015 | | |
| WO | WO-2013034564 A1 * | 3/2013 | ............... | B23K 9/08 |
| WO | WO 2014/140739 A1 | 9/2014 | | |

OTHER PUBLICATIONS

International Search Report and Written Opinion in International Application No. PCT/EP2020/054938, mailed Jun. 9, 2020.

* cited by examiner

STUD WELDING PROCESS AND STUD WELDING DEVICE FOR WELDING A STUD TO A WORKPIECE

CROSS-REFERENCE TO RELATED APPLICATIONS

This patent application is the U.S. National Stage of International Patent Application No. PCT/EP2020/054938, filed Feb. 25, 2020, which claims the benefit of European Patent Application No. 19159636.0, filed Feb. 27, 2019.

The invention relates to a stud welding method for welding a stud to a workpiece, wherein an arc is generated with the aid of a pulsed welding current between the surface of the stud facing the workpiece and the workpiece, and the arc is deflected with the aid of a magnetic field which is generated by a coil through which a current flows.

The invention also relates to a stud welding device for welding a stud to a workpiece, having a welding power source for providing a pulsed welding current for generating an arc between the surface of the stud facing the workpiece and the workpiece, and having a coil for generating a magnetic field for deflecting the arc.

The invention relates to a stud welding method and a stud welding device, wherein a stud is welded to a workpiece. In this case, an arc is ignited between the end face of the stud facing the workpiece and the workpiece, thereby locally melting both the stud and the workpiece. The stud is then connected to the workpiece under low pressure. In this way, for example, threads, studs, sockets, hooks or eyes can be connected to larger workpieces.

The fact that the arc between the end face of the stud and the workpiece is not evenly distributed over the entire cross section of the stud and the part of the workpiece arranged below it results in an uneven melting of the end face of the stud and the workpiece, which reduces the quality of the welded joint.

A general stud welding method has become known, for example, from DE 10 2007 039 308 A1. The application of a magnetic field to deflect the arc to improve the melting of the end face of the stud is not mentioned.

To remedy this, there are methods and devices by means of which the arc is deflected with the aid of a magnetic field. For example, EP 1 649 962 B1 describes a method and system for welding a stud made of solid material having a conical, slightly inclined end face, wherein by applying a transverse magnetic field, a spiral sweeping of the arc over the entire end face of the stud and consequently even melting of the entire end face can be achieved. The spiral sweeping of the arc over the entire end face of the stud is achieved through the special configuration of the face. The disadvantage here is that the stud to be connected to the workpiece must have a certain shape and no arbitrary stud can be used for the welding process.

DE 102 21 387 C1 describes another stud welding method in which improvements can be achieved by an asymmetrical arrangement of the coil for generating the magnetic field deflecting the arc, in particular the welding point can be seen better.

Apart from the above-mentioned stud welding processes, similar problems also occur with general welding processes, since the arc always tends to orient itself in the direction of the ground connection of the workpiece or is deflected by large grounds. This problem can be prevented by a symmetrical arrangement of several ground connections of the workpiece, but when the welding torch moves in relation to the workpiece, there are again deviations in the position of the arc and thus a possible irregular melting of the welding wire and workpiece.

For example, DE 20 2013 011 903 U1 describes an arc welding system having a consumable welding wire, in which the molten droplet is detached or moved from the welding wire end with the help of a magnetic field and the arc is moved forward or backward if necessary to lengthen the weld puddle.

The object of the present invention is to create an above-mentioned stud welding method and an above-mentioned stud welding device for welding a stud to a workpiece, by means of which the most uniform possible distribution of the arc between the end face of the stud and the workpiece underneath results, whereby the stud and the workpiece can be melted evenly, resulting in an optimal welded joint. Special requirements for the stud should not be necessary. The stud welding method in question and the stud welding device in question should be able to be implemented as simply and inexpensively as possible. Disadvantages of the prior art should be avoided or at least reduced.

In terms of the method, the object of the invention is achieved in that the current through the coil for generating the magnetic field for deflecting the arc is controlled synchronously and in opposition to the welding current by always applying a current to the coil for generating the magnetic field for deflecting the arc when the welding current is minimal or low and the deflection coil is switched off or the current through the coil is reduced to a minimum when the welding current is maximum or higher. It has been shown that the arc can be influenced more easily by the transverse magnetic field if it is operated with less power or a lower current, whereas influencing the arc with higher energy or at times greater welding is not so easy. As a result of the synchronous and opposite control of the coil current according to the invention, an optimal position of the arc can be achieved with low procedural complexity at the same time. As a result, the uniform material melting results in a higher quality of the welded joint. In contrast to the prior art mentioned above, a special configuration of the stud from which the arc to the workpiece is ignited is not required. All that is needed is a ground connection on the workpiece, the position of which does not have to be particularly taken into account.

The welding current is preferably pulsed with a pulse frequency between 10 Hz and 1000 Hz, in particular between 50 Hz and 150 Hz. Such values are common in welding processes according to the prior art.

According to a further feature of the invention, it is provided that the welding current is changed between an upper threshold value and a lower threshold value or the welding power is changed between an upper value and a lower value. The upper threshold value of the welding current is adapted to the respective conditions and to the corresponding welding task in order to be able to achieve melting as quickly as possible. The lower threshold value of the welding current is preferably selected so that the arc can be maintained during the welding process. This ensures that the welding current is kept constant. If the welding power is controlled to be constant, the corresponding upper and lower threshold values for the welding power are specified. The welding current is then set on the basis of the regulated welding power.

The duty cycle of the welding current is between 10% and 90%, in particular 50%. The selection of the duty cycle takes place on the one hand according to the aspect of the highest possible energy input into the arc, on the other hand according to the fact that the position of the arc can be influenced more easily in the phases with a lower welding current. A duty cycle of 50% is an optimal compromise here, but changed duty cycles can be advantageous for special applications.

The welding current is advantageously regulated for a constant welding power, preferably between 2 kW and 10 kW. Since the introduction of heat into the arc and thus into the parts to be melted depends largely on the output of the arc, such a control for constant output is advantageous. Changes in the arc voltage are thus compensated for by a change in the welding current, resulting in a constant welding performance.

The current through the coil can be applied with a time offset compared to the welding current. Such a phase shift of the coil current with respect to the welding current to a small extent, for example by a few percent of the period duration, can better influence the arc. With a negative phase shift of the coil current compared to the welding current, the maximum coil current can be achieved earlier.

Further advantages can result from the fact that the current through the coil is switched off a predetermined time span after the start of the welding current and/or a predetermined time span before the end of the welding current. By providing such time periods after the start of the welding process and before the end of the welding process, an improved influencing of the arc by the transverse magnetic field can be achieved. By inserting a period of time after the start of the welding process, the stability of the arc is improved and the position of the arc is fixed. If the transverse magnetic field is switched off before the end of the welding process, a better and more stable end of the welding process can be achieved.

The current through the coil for generating the magnetic field for deflecting the arc can be pulsed with a DC offset. If the current through the coil for generating the magnetic field for deflecting the arc is not completely switched off in the phases of the high welding current, but is operated with a small offset, a certain basic magnetization of the coil can be achieved.

The rate of rise of the current through the coil can be changed, for example, by the amplitude of the voltage applied to the coil and the inductance of the coil. A lower rate of rise enables the welding current to be pulsed with a higher pulse frequency.

If a pre-current phase, preferably between 1 ms and 100 ms, is inserted before the start of the welding process, the process can be improved by preheating. This also stabilizes the arc, and the arc does not break off immediately when pulsing.

A maximum pulse frequency of the welding current can be determined from the time profile of the current through the coil. For example, by deriving the time constant from the profile of the coil current after the first current pulse or after a few current pulses, the maximum possible pulse frequency of the welding current can be calculated back and the welding process limited to this determined maximum pulse frequency.

The object according to the invention is also achieved by a stud welding device mentioned above, in which a control device for controlling the current through the coil for generating a magnetic field for deflecting the arc is provided synchronously and in opposition to the pulsed welding current, so that a current is always applied to the coil when the welding current is minimal or low and the coil is switched off or the current through the coil is reduced to a minimum when the welding current is maximum or higher.

The stud welding device in question can be implemented particularly simply and inexpensively, since only the device for generating the coil current has to be synchronized with the welding current source, which can be easily implemented by a control device or a microcontroller already included in a conventional welding device. Reference is made to the above description of the stud welding method for the further advantages that can be achieved by the stud welding device.

The welding current source is advantageously designed to regulate the welding current for a constant welding power, preferably between 2 kW and 10 kW. By keeping the welding power and thus the energy introduced into the arc constant, a uniform melting of the stud and the workpiece and thus a constant quality of the welded joint is achieved.

In a particularly preferred stud welding device, a stud holder for receiving the stud to be connected to the workpiece and a lifting device for lifting the stud off the workpiece against the force of a spring are provided. As already mentioned above, the stud welding device in question can achieve a uniform melting of the side of the stud or eyebolt facing the workpiece by influencing the position of the arc.

The control device can be designed to determine a maximum pulse frequency of the welding current from the time profile of the current through the coil. As already mentioned above, by analyzing the profile shape of the current through the coil for generating the magnetic field for deflecting the arc or by determining the time constants or the rate of increase, a maximum pulse frequency can be calculated.

The invention is explained in more detail with reference to the accompanying drawings. In the drawings.

Figure 1:
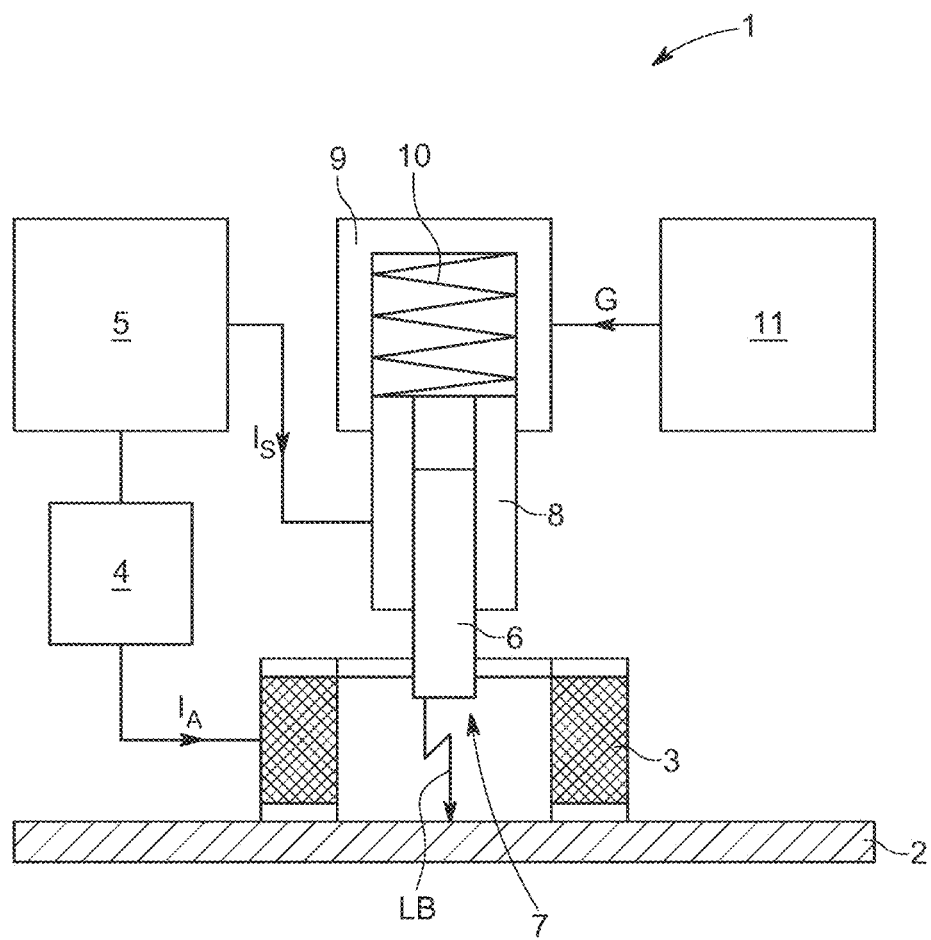
FIG. 1 is a block diagram of a stud welding device for welding a stud to a workpiece with a coil for generating a magnetic field for deflecting the arc.

FIG. 1 shows a block diagram of a stud welding device 1 for welding a stud 6 to a workpiece 2 with a coil 3 for generating a magnetic field for deflecting the arc LB. The stud welding device 1 contains a stud holder 8 for receiving the stud 6, which is connected to a corresponding lifting device 9. The lifting device 9 can be formed by a lifting magnet which lifts the stud holder 8 together with the stud 6 against the force of a spring 10 from the workpiece 2. Instead of the spring 10, the lifting device 9 can also be formed by a double lifting magnet which both lifts the stud 9 from the workpiece 2 and presses it against the workpiece 2 (not shown). A welding current $I_s$ is applied to the stud 6 by a welding current source 5, as a result of which an arc LB is ignited between the surface 7 of the stud 6 facing the workpiece 2 and the workpiece 2. The position of the arc LB changes very indefinitely during the welding process, which leads to a different melting of the surface 7 of the stud 6 and the workpiece 2 and, after the stud 6 is pressed against the workpiece 2, a different quality of the welded joint. To influence the position of the arc LB, a coil 3 is arranged about the welding point to generate a magnetic field which is oriented transversely to the arc LB and locally deflects it. In the event of uncontrolled control of the coil current $I_A$, the position of the arc LB cannot be influenced in a targeted manner. In the present invention, however, the coil 3 is acted upon by a control device 4 (coil current source) with a current $I_A$, which is controlled synchronously and in opposition to the welding current $I_s$. This results in a more intensive effect on the position of the arc LB and a more uniform melting of the surface 7 of the stud 6 and of the workpiece 2.

The welding device 1 is characterized by a relatively simple and inexpensive implementation. In any case, a gas reservoir 11 can be provided which supplies the welding point with a corresponding protective gas G. The welding current $I_s$ and the current $I_A$ through the coil 3 are also generally welding parameters which, according to the invention, are set, controlled, regulated or the like. Of course, the invention can also be carried out if other welding parameters, such as welding power $P_s$ and/or time parameters, are changed.

Figure 2:
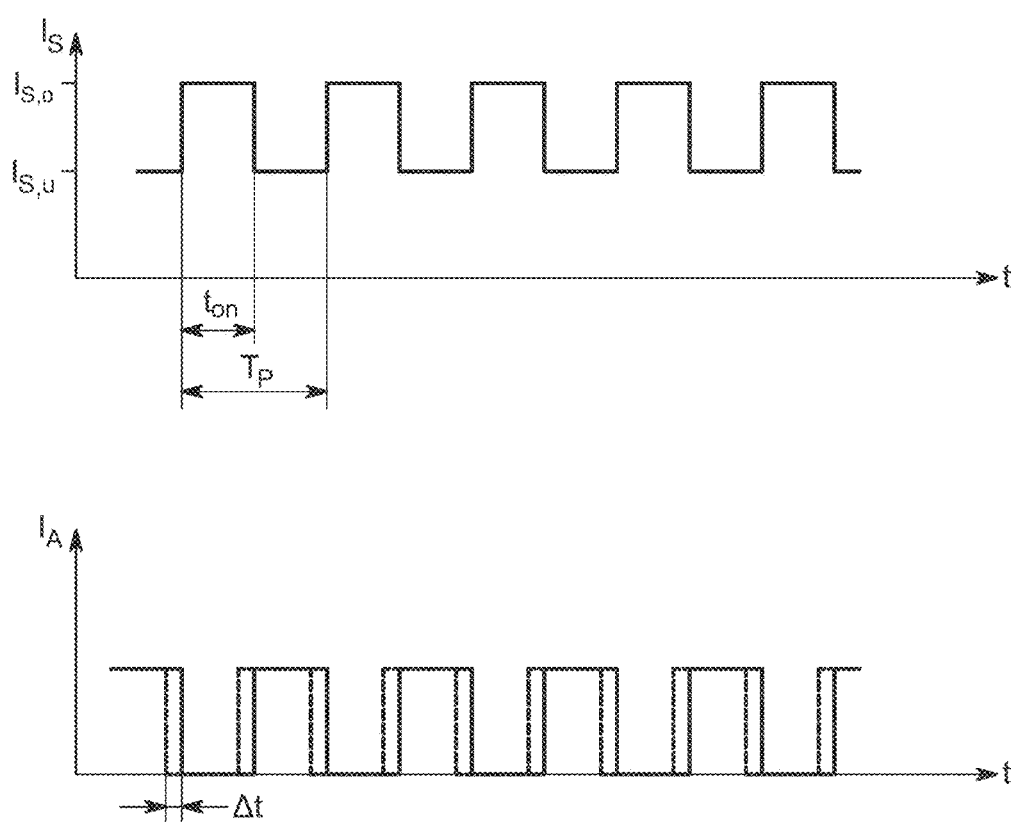
FIG. 2 shows the time profiles of the pulsed welding current and of the current controlled according to the invention through the coil for generating the magnetic field for deflecting the arc according to a first embodiment.

FIG. 2 shows the time profiles of the pulsed welding current $I_s$ and the current $I_A$ controlled according to the invention through the coil 3 for generating the magnetic field for deflecting the arc LB according to a first embodiment. The welding current $I_s$ is switched between an upper threshold value for the welding current $I_{s,o}$ and a lower threshold value for the welding current $I_{s,u}$. In the embodiment shown, an upper threshold value for the welding current $I_{s,o}$ is maintained during the time ton and a lower threshold value for the welding current $I_{s,u}$ is maintained during the remaining time for the period duration $T_P$. In the example shown, the switch-on time ton is half the period duration $T_P$, which is equivalent to a duty cycle of 50%. In this embodiment, a constant welding current $I_s$ is regulated, so that a welding power $P_s$ is established as a function of the welding voltage $U_s$ across the arc LB.

According to the invention, the current $I_A$ through the coil 3 is controlled synchronously and in opposition to the pulsed welding current $I_s$. During the time $t_{on}$ of the upper threshold value of the welding current $I_{s,o}$, the coil current $I_A$ is zero or minimal, whereas the coil current $I_A$ is maximum when the welding current $I_s$ is at the lower threshold value $I_{s,u}$. As a result, the position of the arc LB is optimally influenced.

By a slight phase shift of the coil current $I_A$ with respect to the welding current $I_s$ by a time offset Δt, the maximum of the coil current $I_A$ can be reached earlier.

Figure 3:
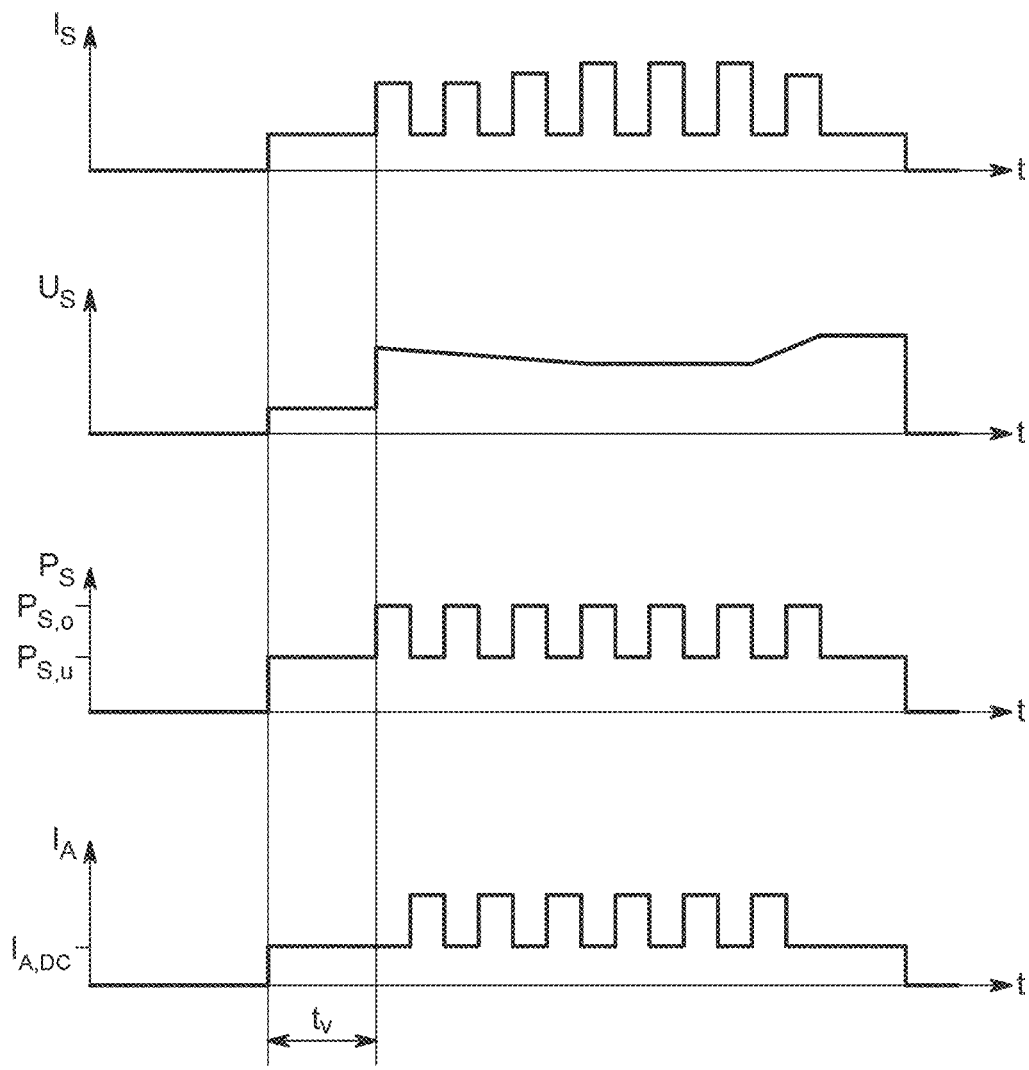
FIG. 3 shows the time profiles of the welding current, the welding voltage, the pulsed welding power and the current through the coil for generating the magnetic field for deflecting the arc according to a further embodiment with power control.

FIG. 3 shows the time profiles of the welding current $I_s$, the welding voltage $U_s$, the pulsed welding power $P_s$ and the current $I_A$ through the coil 3 for generating the magnetic field for deflecting the arc LB according to a further embodiment with power control. In this embodiment, a control is carried out at a constant welding power $P_s$ in which the welding current $I_s$ is changed accordingly, as a function of the welding voltage $U_s$. When the arc or welding voltage $U_s$ is reduced, the welding current $I_s$ is increased, whereas when the welding voltage $U_s$ increases, the welding current $I_s$ is reduced, resulting in a constant mean welding power $P_s$. The current $I_A$ through the coil 3 is controlled accordingly in opposition to and synchronously with the welding current $I_s$. Instead of switching off the coil 3, equivalent to a coil current $I_A$=0 (see FIG. 2) a certain equal DC component or DC offset $I_{A,DC}$ to the coil 3 can be created. Before the start of the welding process, a pre-current phase with a duration $t_v$ can be inserted.

Figure 4:
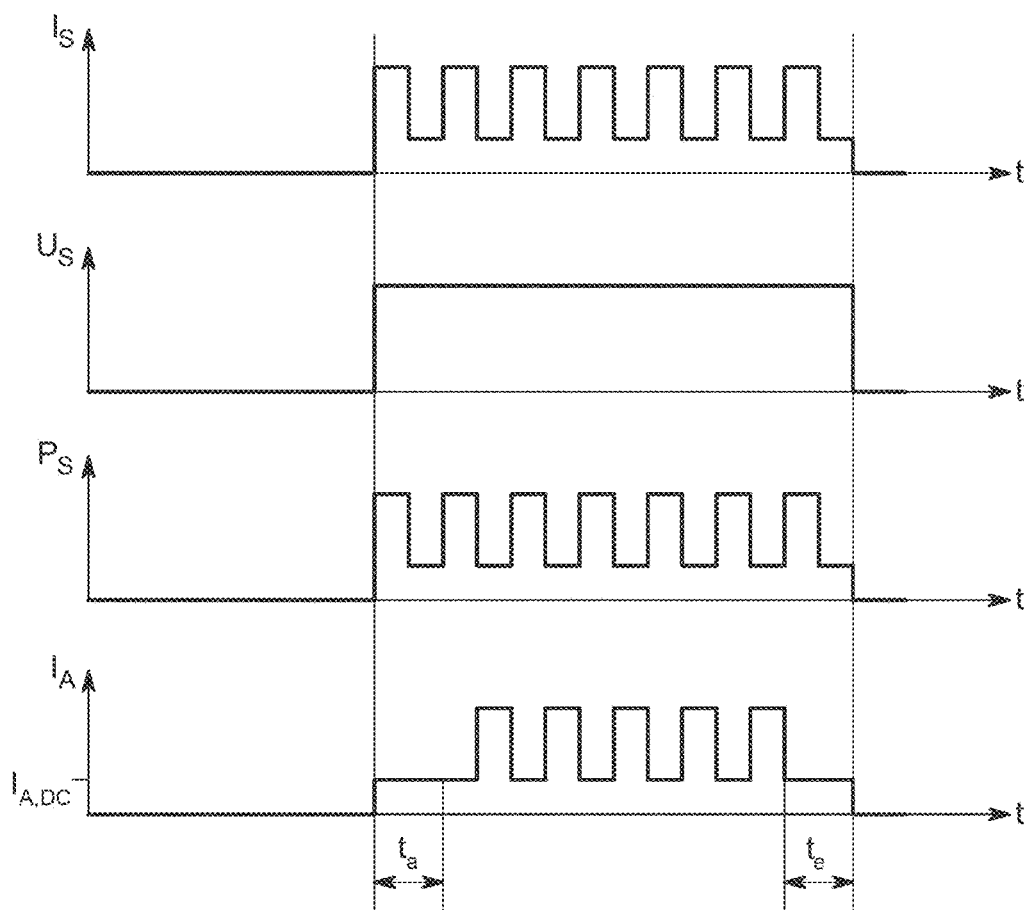
FIG. 4 shows the time profiles of the welding current, the welding voltage, the welding power, and the current through the coil for generating the magnetic field for deflecting the arc according to a further embodiment with a time delay of the coil current.

FIG. 4 shows the time profiles of the welding current $I_s$, the welding voltage $U_s$, the welding power $P_s$ and the current $I_A$ through the coil 3 for generating the magnetic field for deflecting the arc LB according to a further embodiment. There is no pre-current phase with a duration $t_v$ as shown in FIG. 3, so that the welding process and the inventive synchronous opposite control of the current $I_A$ are started immediately. As shown, however, the control of the current $I_A$ through the coil 3 for generating the magnetic field for deflecting the arc LB started with a time delay and ended a predetermined time period earlier. The coil current $I_A$ can be switched on delayed by a preset time period $t_a$ after the start of the welding process and switched off by a preset time period $t_e$ before the end of the welding process. During the time periods $t_a$ and $t_e$, the current $I_A$ through the coil 3 can correspond to a certain equal DC component or DC offset $I_{A,DC}$, which can be for example 10%-20% of the maximum current $I_A$. The current $I_A$ through the coil 3 can also be zero during the time periods $t_a$ and $t_e$. Regardless of the value of the current $I_A$, the insertion of the time period $t_a$ after the start of the welding process improves the stability of the arc LB. The deflection of the arc LB is therefore started with a delay. A more stable end of the welding method can be achieved by inserting a preset time period $t_e$ before the end of the welding process, in that the deflection of the arc LB is ended early.

It can be seen from FIGS. 3 and 4 that it is not essential for the invention whether a constant welding current $I_s$ or a constant welding power $P_s$ is regulated, since the relevant pulses of the welding current $I_s$ are also identical in the welding power $P_s$. It is important that the pulses of the current $I_A$ through the coil 3 are synchronously opposed to both the pulses of the welding current $I_s$ and the pulses of the welding power $P_s$.

Figure 5:
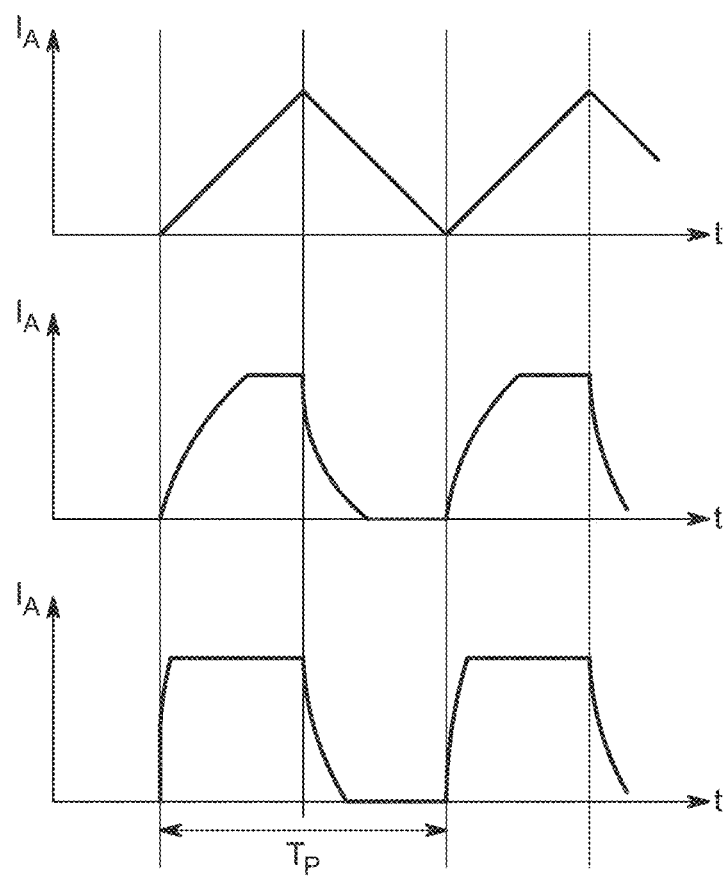
FIG. 5 shows three variants of the time profile of the current through the coil for generating the magnetic field for deflecting the arc with three different rates of rise.

FIG. 5 shows three variants of the time profile of the current $I_A$ through the coil 3 for generating the magnetic field for deflecting the arc with three different rates of increase $t_r$. In the top time diagram of FIG. 5, the coil current $I_A$ rises at a very slow rate of increase, resulting in a quasi triangular profile of the coil current. By applying a higher voltage or change of the inductance of the coil 3, a higher rate of rise can be achieved according to the second time diagram. In the last time profile, an almost rectangular profile of the coil current $I_A$ is achieved with a particularly low rate of increase.

Figure 6:
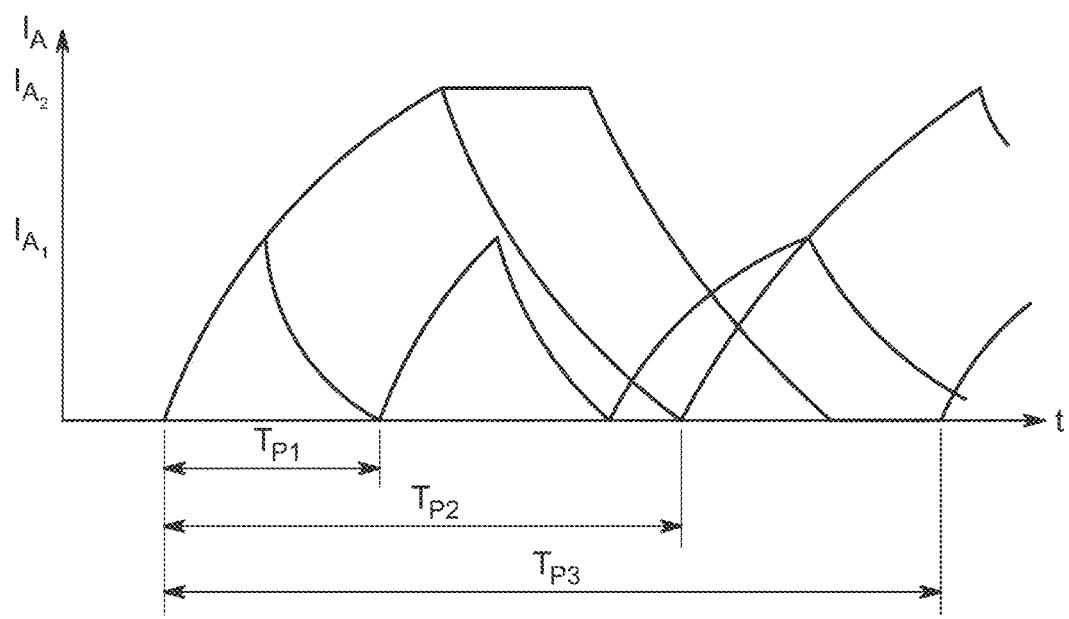
FIG. 6 shows the time profile of the current through the coil for generating the magnetic field for deflecting the arc to explain the determination of the maximum pulse frequency of the welding current.

FIG. 6 shows the time profile of the current through the coil for generating the magnetic field for deflecting the arc to explain the determination of the maximum pulse frequency of the welding current. By determining the time constant or rate of rise of the coil current $I_A$, the maximum achievable pulse frequency $f_P$ can be calculated back. Depending on the amplitude of the coil current $I_A$, different maximum period times $T_P$ or different maximum pulse frequencies $f_P=1/T_P$ result. In the example with a lower amplitude $I_{A1}$, a shorter period $T_{P1}$ or a higher maximum pulse frequency $f_{P1}=1/T_{P1}$ results. With a higher amplitude of the current $I_{A2}$ through the coil 3, a higher period $T_{P2}$ results, which is equivalent to a lower maximum pulse frequency $f_P$. In the third example with the higher amplitude of the current $I_{A2}$, the current $I_A$ is not switched off again immediately after the maximum $I_{A2}$ has been reached, but the maximum $I_{A2}$ is maintained for a certain time. This results in the period $T_{P3}$ or the pulse frequency $f_{P3}=1/T_{P3}$.

The invention claimed is:

1. A stud welding method for welding a stud to a workpiece (2), wherein with an aid of a pulsed welding current ($I_s$) an arc (LB) is generated between a surface of the stud facing the workpiece and the workpiece, and the arc (LB) is deflected with an aid of a magnetic field generated by a coil through which a current ($I_A$) flows, the method comprising controlling the current ($I_A$) synchronously and in opposition to the pulsed welding current ($I_s$) through the coil for generating the magnetic field for deflecting the arc (LB), by applying a current ($I_A$) to the coil whenever the pulsed welding current (Is) is minimal, and the coil is switched off or the current ($I_A$) through the coil is reduced to a minimum when the welding current ($I_s$) is maximum.

2. The stud welding method according to claim 1, comprising pulsing the pulsed welding current ($I_s$) with a pulse frequency ($f_p$) between 10 Hz and 1000 Hz.

3. The method of claim 2, comprising pulsing the pulsed welding current ($I_s$) between 50 Hz and 150 Hz.

4. The stud welding method according to claim 1, comprising changing the pulsed welding current ($I_s$) between an upper threshold value ($I_{s,o}$) and a lower threshold value ($I_{s,u}$) or changing welding power ($P_s$) between an upper value ($P_{s,o}$) and a lower value ($P_{s,u}$).

5. The stud welding method according to claim 1, wherein the duty cycle of the pulsed welding current ($I_s$) is between 10% and 90%.

6. The method of claim 5, wherein the duty cycle of the pulsed welding circuit ($I_s$) is 50%.

7. The stud welding method according to claim 1, comprising regulating the pulsed welding current ($I_s$) for a constant welding power ($P_s$).

8. The method of claim 7, comprising regulating the pulsed welding circuit ($I_s$) for a constant welding power ($P_s$), between 2 kW and 10 kW.

9. The stud welding method according to claim 1, comprising applying the current ($I_A$) through the coil with a time offset ($\Delta t$) with respect to the welding current ($I_s$).

10. The stud welding method according to claim 1, comprising switching off the current ($I_A$) through the coil for a predetermined time span ($t_a$) after starting the pulsed welding current ($I_s$) and/or for a predetermined time span ($t_e$) before ending the welding pulsed current ($I_s$).

11. The stud welding method according to claim 1, comprising pulsing the current ($I_A$) through the coil with a DC offset ($I_{A,DC}$).

12. The stud welding method according to claim 1, comprising changing a rate of rise ($t_r$) of the current ($I_A$) through the coil.

13. The stud welding method according to claim 1, comprising inserting a pre-current phase ($t_v$), before starting the method.

14. The method of claim 13, comprising inserting a pre-current phase between 1 ms and 100 ms before starting the method.

15. The stud welding method according to claim 1, comprising determining a maximum pulse frequency ($f_{P,max}$) of the welding current ($I_s$) from a time profile of the current ($I_A$) through the coil.

16. A stud welding device for welding a stud to a workpiece, having a welding current source for providing a pulsed welding current ($I_s$) for generating an arc (LB) between a surface of the stud facing the workpiece and the workpiece, and having a coil for generating a magnetic field for deflecting the arc (LB), comprising a control device for controlling the current ($I_A$) provided by the coil synchronously and in opposition to the pulsed welding current ($I_s$), so that the coil can always be supplied with a current ($I_A$) when the pulsed welding current (Is) is minimal, and so the coil is switched off or the current ($I_A$) through the coil is reduced to a minimum when the pulsed welding current ($I_s$) is maximum.

17. The stud welding device according to claim 16, characterized in that wherein the welding power source is designed to regulate the pulsed welding current ($I_s$) for a constant welding power ($P_s$).

18. The stud welding device of claim 17, wherein the welding power source is designed to regulate pulsed welding current ($I_s$) for a constant welding power ($P_s$) between 2 kW and 10 kW.

19. The stud welding device according to claim 16, wherein a stud holder for receiving the stud to be connected to the workpiece and a lifting device for lifting the stud from the workpiece is provided against a force of a spring.

20. The stud welding device according to claim 19, wherein the control device for determining a maximum pulse frequency ($f_{P,max}$) of the welding current ($I_s$) from the time profile of the current ($I_A$) through the coil is formed.

* * * * *